(12) United States Patent
Jenner

(10) Patent No.: US 6,941,631 B2
(45) Date of Patent: Sep. 13, 2005

(54) OPTICAL COMPONENT PLASTIC DEFORMATION CONTROL PROCESS

(75) Inventor: Robert K. Jenner, Atkinson, NH (US)

(73) Assignee: Axsun Technologies, Inc., Billerica, MA (US)

( * ) Notice: Subject to any disclaimer, the term of this patent is extended or adjusted under 35 U.S.C. 154(b) by 29 days.

(21) Appl. No.: 09/773,944

(22) Filed: Feb. 1, 2001

(65) Prior Publication Data

US 2002/0033938 A1 Mar. 21, 2002

Related U.S. Application Data

(63) Continuation-in-part of application No. 09/667,186, filed on Sep. 21, 2000.

(51) Int. Cl.[7] .......................... G01M 19/00; B23Q 17/00
(52) U.S. Cl. ................ 29/407.1; 29/407.05; 29/407.09; 29/464; 29/468; 385/92; 385/90
(58) Field of Search ......................... 29/407.01, 407.05, 29/407.08, 407.09, 407.1, 559, 464, 466, 467, 468; 385/90, 88, 92

(56) References Cited

U.S. PATENT DOCUMENTS

| | | | |
|---|---|---|---|
| 3,527,454 A | | 9/1970 | Humm ........................ 269/45 |
| 3,651,957 A | | 3/1972 | Ball et al. ..................... 294/106 |
| 3,824,674 A | | 7/1974 | Inoyama et al. .......... 29/407.05 |
| 3,908,522 A | | 9/1975 | Bender ........................ 493/194 |
| 3,937,072 A | * | 2/1976 | Huydts et al. ................. 73/852 |
| 4,092,719 A | | 5/1978 | Salmon ........................ 29/711 |
| 4,214,353 A | | 7/1980 | Kalina .......................... 29/855 |
| 4,237,474 A | | 12/1980 | Ladany ........................ 385/49 |
| 4,435,037 A | | 3/1984 | Abramson et al. .......... 350/96.2 |
| 4,653,794 A | | 3/1987 | Atlas ........................ 294/119.1 |
| 4,691,586 A | | 9/1987 | Van Leijenhorst et al. ... 74/479 |
| 4,691,905 A | | 9/1987 | Tamura et al. ................ 269/45 |

(Continued)

FOREIGN PATENT DOCUMENTS

| | | | | |
|---|---|---|---|---|
| EP | 0 030 617 A2 | 11/1980 | ............ | G02B/7/26 |
| EP | 0 168 820 A2 | 1/1986 | ............ | G02B/6/42 |
| EP | 0 193 991 A1 | 9/1986 | ............ | B23Q/1/14 |
| EP | 0 286 319 A1 | 10/1988 | ............ | G02B/6/42 |
| EP | 0 356 331 A2 | 2/1990 | ............ | G02B/6/42 |
| EP | 0 481 877 B1 | 1/1993 | ............ | G02B/6/42 |
| EP | 0 545 584 A1 | 6/1993 | ............ | G02B/6/42 |

(Continued)

OTHER PUBLICATIONS

Andreasch, Wolfgang, et al., "Flexible Automated Assembly of Micro–Optical Elements (Optical SMD) ", Proc. SPIE, vol. 2906, pp. 162–170, Microrobotics: Components and Applications, Armin Sulzmann: Ed., (published Dec. 1996).

Enochs, Scott, "A Packaging Technique to Achieve Stable Single–Mode Fiber to Laser Alignment", Pro. SPIE, vol. 703, pp. 42–47 Integration and Packaging of Optoelectronic Devices (1986).

Madou, Marc, "Fundamentals of Microfabrication", Boca Raton, N.Y., pp. 312–313.

(Continued)

*Primary Examiner*—Marc Jimenez
(74) *Attorney, Agent, or Firm*—Houston Eliseeva LLP

(57) ABSTRACT

A process for aligning an optical component by plastic deformation comprises finding a desired position of an optical axis of the optical component relative to a rest position of the optical axis of the optical component. Then, a deformation force is exerted, which is greater than a yield force of the optical component to thereby plastically deform the optical component in a direction of the desired position. The alignment process addresses mechanical compliance in the alignment system and/or optical system during the plastic deformation of optical components of the optical system. This mechanical compliance arises from the fact that there is typically flexing in the alignment system between the encoders and the part of the alignment system that actually engages the optical component.

16 Claims, 5 Drawing Sheets

U.S. PATENT DOCUMENTS

| | | | |
|---|---|---|---|
| 4,702,556 A | 10/1987 | Ishii et al. | 350/320 |
| 4,720,163 A | 1/1988 | Goodwin et al. | 350/96.2 |
| 4,773,727 A | 9/1988 | LePivert et al. | 350/96.2 |
| 4,778,241 A | 10/1988 | Haltenorth | 350/96.2 |
| 4,796,346 A | 1/1989 | Kawasaki et al. | 29/559 |
| 4,822,091 A | 4/1989 | Vermeer et al. | 29/740 |
| 4,833,776 A | 5/1989 | Wakamiya et al. | 29/837 |
| 4,967,472 A | 11/1990 | Ebihara et al. | 29/797 |
| 5,161,847 A | 11/1992 | Yakou | 294/119.1 |
| 5,177,807 A | 1/1993 | Avelange et al. | 385/91 |
| 5,195,155 A | 3/1993 | Shimaoka et al. | 385/90 |
| 5,212,746 A | 5/1993 | Miller et al. | 385/25 |
| 5,217,460 A | 6/1993 | Knoepfler | 606/1 |
| 5,255,333 A | 10/1993 | Althaus et al. | 385/33 |
| 5,295,700 A | 3/1994 | Crews et al. | 279/5 |
| 5,351,330 A | 9/1994 | Jongewaard | 385/93 |
| 5,388,119 A | 2/1995 | Cronin et al. | 372/69 |
| 5,562,320 A | 10/1996 | Bloomberg et al. | 294/119.1 |
| 5,570,444 A | 10/1996 | Janssen et al. | 385/90 |
| 5,600,749 A | 2/1997 | Lee et al. | 385/70 |
| RE35,605 E | 9/1997 | Nomaru et al. | 294/119.1 |
| 5,745,624 A | 4/1998 | Chan et al. | 385/91 |
| 5,760,367 A | 6/1998 | Rosenwasser et al. | 219/121.6 |
| 5,870,518 A | 2/1999 | Haake et al. | 385/90 |
| 5,910,894 A | 6/1999 | Pryor | 29/712 |
| 5,926,594 A | 7/1999 | Song et al. | 385/49 |
| 5,996,437 A | 12/1999 | Novak et al. | 901/16 |
| 6,015,174 A | 1/2000 | Raes et al. | 294/2 |
| 6,034,524 A | 3/2000 | Barringer et al. | 324/158.1 |
| 6,053,640 A | 4/2000 | Miyokawa et al. | 385/88 |
| 6,074,103 A | 6/2000 | Hargreaves et al. | 385/90 |
| 6,076,875 A | 6/2000 | Neff et al. | 294/119.1 |
| 6,098,264 A * | 8/2000 | Harrigan et al. | 29/407.09 |
| 6,103,988 A | 8/2000 | Kim | 219/121.63 |
| 6,138,337 A * | 10/2000 | Lezuch et al. | 29/407.05 |
| 6,278,953 B1 | 8/2001 | Bergmann | 702/85 |
| 6,492,614 B2 * | 12/2002 | Murdza et al. | 219/121.64 |
| 6,559,464 B1 | 5/2003 | Flanders et al. | 250/548 |
| 6,606,435 B1 * | 8/2003 | Irie et al. | 385/52 |
| 6,625,372 B1 * | 9/2003 | Flanders et al. | 385/134 |

FOREIGN PATENT DOCUMENTS

| | | | | |
|---|---|---|---|---|
| EP | 0 717 297 A2 | 6/1996 | | G02B/6/42 |
| EP | 1 059 547 A1 | 12/2000 | | G02B/6/42 |
| EP | 1 134 607 A2 | 9/2001 | | G02B/27/62 |
| FR | 2 690 996 A1 | 11/1993 | | G02B/6/42 |
| GB | 2 124 402 A | 2/1984 | | G02B/7/26 |
| GB | 2229856 A | * | 3/1990 | |
| GB | 2 229 856 A | 10/1990 | | G02B/6/42 |
| GB | 2 296 100 A | 6/1996 | | G02B/6/42 |
| JP | 62 058646 | 3/1987 | | H01L/21/58 |
| JP | 62 276515 | 12/1987 | | G02B/6/42 |
| JP | 03100506 | 4/1991 | | G02B/6/42 |
| JP | 11 068243 | 3/1999 | | H01S/3/18 |
| WO | WO 91/06022 | * | 5/1991 | |
| WO | 91 06022 | 5/1991 | | G02B/6/36 |
| WO | 92 02837 | 2/1992 | | G02B/6/42 |
| WO | WO 98/58287 | 12/1998 | | G02B/6/42 |
| WO | 99/63373 | 12/1999 | | G02B/6/12 |
| WO | WO 00/29890 | * | 5/2000 | |
| WO | 00/41021 | 7/2000 | | G02B/6/42 |

OTHER PUBLICATIONS

Mohr, J., "Free Space Optical Components and Systems Based on LIGA Technology", 2000 IEEEILEOS International Conference on Optical MEMS, Kauai, Hawaii, Aug. 21–24, 2000, IEEE Catalog #00EX399.

Kravitz, S.H., et al., "A Passive Micromachined Device for Alignment of Arrays of Single–mode Fibers for Manufacturable Photonic Packaging ", Proceedings of the Lasers and Electro–Optics Society Annual Meeting (LEOS), US, New York, IEEE, vol. Meeting 7, Oct. 31, 1994, pp. 226–227.

Oh, Kwang W., et al., "Flip–Chip Packaging Using Micromachined Conductive Polyhmer Bumps and Alignment Pedestals for MOEMS ", IEEE Journal of Selected Topics in Quantum Electronics, vol. 5, No. 1, Jan./Feb. 1999, pp. 119–126.

Rogner†, A., et al., "LIGA–based Flexible Microstructures for Fiber–Chip Coupling", J. Micromech. Microeng. 1 (1991), pp. 167–170.

Scussat, M., et al., "An Innovative Flexible and Accurate Packaging Technique Suited to Fabricate Low Cost Micro Optoelectronic Modules", Electronic Components and Technology Conference, IR–IOA, DMT, EPFL, 1015 Lausanne, Switzerland (2000).

Scussat, Marco, et al., "Automated Surface Mounting of Miniature Optical Elements", DMT, EPFL, 1015 Lausanne, Switzerland (1998).

Sharpe, William N., et al., "Mechanical Properties of LIGA–Deposited Nickel for MEMS Transducers", 1997 International Conference on Solid–State Sensor and Actuators, Chicago, Jun. 16–19, 1997, pp. 607–610.

Würsch, Alain, et al., "An Innovative Micro Optical Element Assembly Robot Characterized by High Accuracy and Flexibility", Electronic Components Conference 2000, DMT, EPFL, 1015 Lausanne , Switzerland (2000).

Ziegler, P., et al., "Passive Alignment and Hybrid Integration of Active and Passive Optical Components on a Microoptical LIGA–Bench", Micro Opto Electro Mechanical System—MOEMS 1999, pp. 186–189.

Goldfarb, Michael, et al., "Design of a Minimum Surface–Effect Three Degree–of–Freedom Micromanipulator", Proceedings of the 1997 IEEE International Conference on Robotics and Automation, Albuquerque, New Mexico—Apr., 1997, pp. 1466–1471.

Goldfarb, Michael, et al., "Eliminating Non–Smooth Nonlinearities with Compliant Manipulator Design". Proceedings of the American Control Conference, Philadelphia, PA—Jun., 1998, pp. 2118–2123.

Henein, Simon, et al., "Articulated Structures with Flexible Joints Dedicated to High Precision Robotics". Departement de Microtechnique, Institut de Systemes Robotiques (DMT–ISR), Swiss Federal Institute of Technolgoy Lausanne (EPFL), EPFL CH–1015, Lausanne, Switzerland, pp. 1–6.

Speich, John E., et al., "A Three Degree–of–Freedom Flexure–Based Manipulator for High Resolution Spatial Micromanipulation", Part of the SPIE Conference on Microrobotics and Micromanipulation, Boston, MA, Nov., 1998, SPIE vol. 3519, pp. 82–92.

* cited by examiner

OPTICAL COMPONENT PLASTIC DEFORMATION CONTROL PROCESS

RELATED APPLICATION

This application is a Continuation-in-Part of U.S. application Ser. No. 09/667,186, filed on Sep. 21, 2000, the entire teachings of which are incorporated herein by this reference.

BACKGROUND OF THE INVENTION

Component alignment is of critical importance in microoptical systems and especially semiconductor and/or MOEMS (microoptical electromechanical systems) optical system manufacturing. The basic nature of light requires that light generating, transmitting, and modifying components must be positioned accurately with respect to one another, especially in the context of free-space-interconnect optical systems, in order to function properly and effectively. Scales characteristic of optical semiconductor and MOEMS technologies can necessitate micron to sub-micron alignment accuracy.

Consider the specific example of coupling light from a semiconductor diode laser, such as a pump or transmitter laser, to single mode fiber. Only the power that is coupled into the fiber core is usable, and the coupling efficiency is highly dependent on accurate alignment between the laser output facet and the core; inaccurate alignment can result in partial or complete loss of signal transmission through the optical system. Moreover, if polarization-maintaining fiber is used, there is an added need to rotationally align the fiber relative to the laser to maintain the single polarization characteristic of the output signal.

Other more general examples include optical amplification, receiving and/or processing systems. Some alignment is typically required between an optical signal source, such as the fiber endface, and a detector. In more complex systems including tunable filters, for example, alignment is required not only to preserve signal power, dynamic range, but also to yield high quality systems through the suppression of undesirable optical modes within and without the systems.

In the example of a tunable filter system, light, typically provided by fiber, is supplied to an optical train, including a tunable filter, such as Fabry-Perot (FP) tunable filter. The launch characteristics of the light into the FP filter cavity determine the side mode suppression ratio (SMSR) of the system. This ratio, in part, dictates the quality of the system. If light is launched into the filter at the wrong position or with the wrong spot size, higher order modes are excited in the filter, degrading the system's SMSR. Typically, filter train alignment is employed to extract the highest possible SMSR.

Generally, there are two types of alignment strategies: active and passive. Typically, in passive alignment of the optical components, registration or alignment features are fabricated directly on the optical components, such as the optical elements or element mounting structures, and/or the platform on which the components are to be mounted. The components are then mounted and bonded directly to the platform using the alignment features. In active alignment, an optical signal is transmitted through the components and detected. The alignment is performed based on the transmission characteristics to enable the highest possible performance level for the system.

In the context of commercial volume manufacturing, selection between active and passive alignment, or some mix of the two, is determined based on the quality of part needed. Lower cost, lower performance devices are typically manufactured with entirely passive alignment strategies, whereas the manufacture of high performance devices typically involves at least some active alignment.

Another dimension to the alignment challenge concerns how optical component alignment is effected. Solder joining and laser welding are two common mounting techniques. Solder attachment of optical elements can be accomplished by performing alignment with a molten solder joint between the element to be aligned and the platform or substrate to which it is being attached. The solder is then solidified to "lock-in" the alignment. In some cases, an intentional offset is added to the alignment position prior to solder solidification to compensate for subsequent alignment shifts due to solidification shrinkage of the solder. In the case of laser welding, the fiber, for example, is held in a clip that is then aligned to the semiconductor laser and welded in place. The fiber may then also be further welded to the clip to yield alignment along other axes. Secondary welds are often employed to compensate for alignment shifts due to the weld itself, but as with solder systems, absolute compensation is difficult. Other alignment strategies for optical systems rely on the plastic deformation of the optical component after its installation so that an optical element of the component is brought into an improved alignment with respect to the surrounding optical system.

SUMMARY OF THE INVENTION

Plastic deformation-based alignment strategies rely on first understanding the stress, strain/yield-point characteristics of the optical component coupled with the ability to apply the force necessary to achieve alignment in view of these characteristics. Ideally, the optical component would be moved into a proper alignment and then simply released. The optical components, however, have elasticity. Thus, it is typically required, during the plastic deformation, to deform the optical component "beyond" the desired alignment position by a carefully controlled distance, such that when the optical component is released, it elastically returns to the desired alignment position.

The present invention is directed to an alignment process that addresses mechanical compliance in the alignment system and/or optical system during the plastic deformation of optical components of the optical system. This mechanical compliance arises from the fact that there is typically flexing in the alignment system between the encoders and the part of the alignment system that actually engages the optical component. Moreover, it is typically desirable to perform the alignment on a partially completed optical system, which has been installed into a hermetic package, typically prior to lid sealing. Thus, the hermetic package is typically clamped in a chuck. There is typically no way to detect compliance between the optical bench of the optical system and the package and possibly, an intervening thermoelectric cooler. This prevents simple process of finding the desired location then deforming the component until it is consistent with that desired position. Thus, the present invention is directed to a plastic deformation system that addresses this "mechanical slop" that is endemic to the underlying mechanical system.

In general, according to one aspect, the invention features a process for aligning an optical component by plastic deformation. The process comprises finding a desired position of an optical axis of the optical component relative to a rest position of the optical axis of the optical component.

Then, a deformation force is exerted, which is greater than a yield force of the optical component to thereby plastically deform the optical component in a direction of the desired position.

According to the preferred embodiment, the step of determining the rest position is performed after the step of finding the desired position to account for any plastic deformation and/or work hardening that are induced during the process of finding the desired position.

Moreover, preferably, to avoid backlash problems in the mechanical system, the optical component is not plastically deformed beyond the desired position with respect to a previous rest position. Also, in the preferred embodiment, to track whether or not the alignment process is converging, an active alignment signal is monitored during the deformation process. If the level of this active alignment signal falls substantially below a level of the peak active alignment signal, which was determined during the desired position search, as the optical component is moved through the desired position during the process of deformation, the new desired position is determined relative to a new rest position and the alignment process is restarted.

According to one application, the process is used to align a fiber endface, which is supported on a deformable structure. This alignment can be performed based upon a level of back reflection as an active alignment signal.

According to another application, an optical signal is transmitted through an optical element of the optical component and spectrally analyzed. The optical component is then aligned to improve side mode suppression, for example.

According to still another application, an optical signal is generated by energizing an active device on the optical bench. Mounting structure for an optical fiber is then deformed based upon the amount of optical signal that is coupled into the optical fiber.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
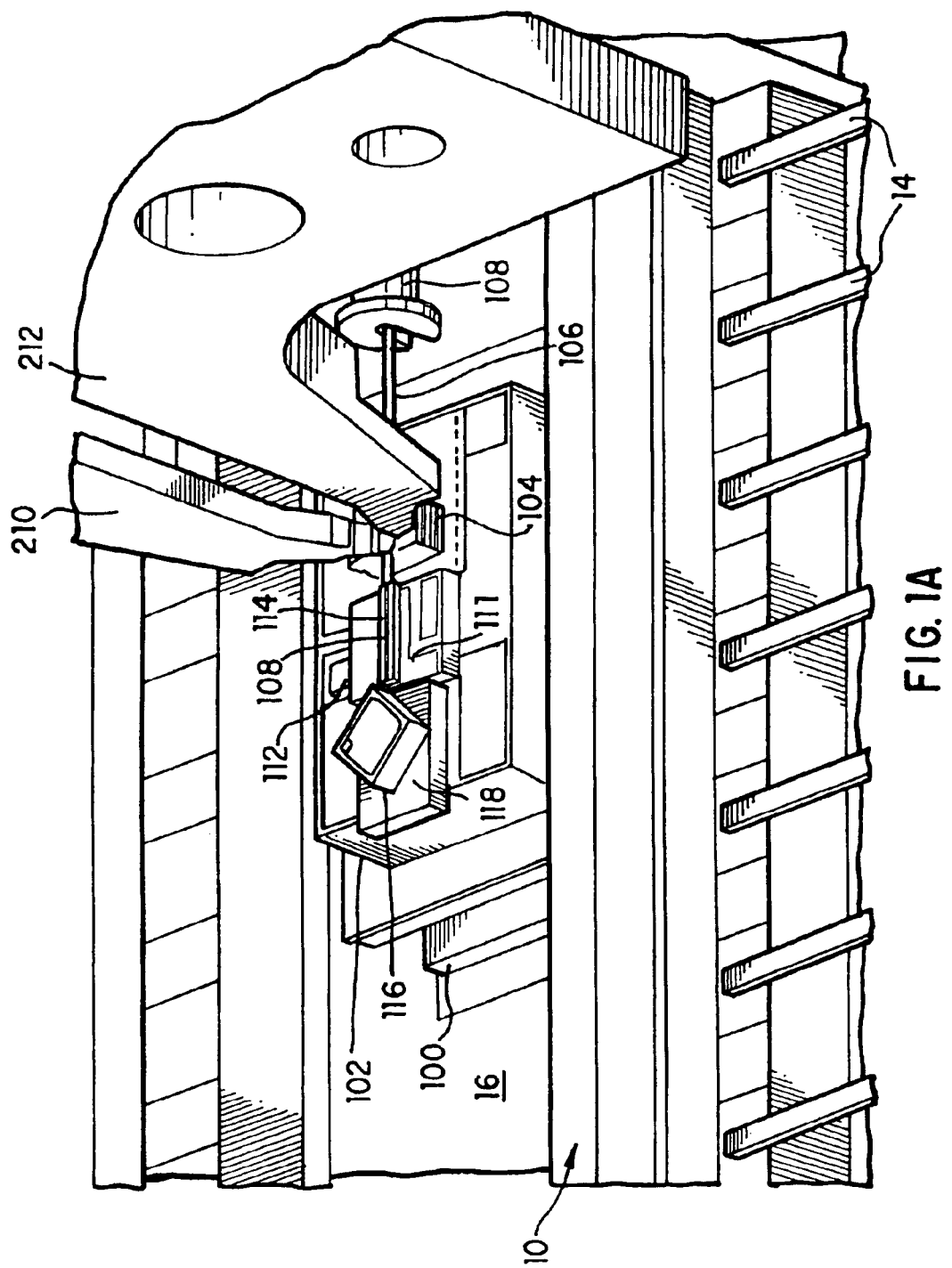
FIGS. 1A and 1B are perspective views of an alignment system aligning an optical fiber endface to a semiconductor laser chip to illustrate an exemplary application of the present invention.

FIG. 1A shows a semiconductor laser system, which is used herein to illustrate an application of the present invention.

Specifically, the system comprises a package 10. In the illustrated example, a butterfly package is used in which leads 14 extend laterally from the package. In other implementations, the invention can also be applied to DIP packages where the leads 14 extend orthogonally from the floor 16 of the package 10.

In the illustrated cooled laser system, a thermo-electric cooler 100 is installed on the floor 16 of the package 10. These coolers are typically driven in response to the temperature within the package, detected by thermistor 112 for example, to maintain a temperature-stable operating environment for the semiconductor laser chip 114.

A bench or submount 102 is secured to the cooler 100. In the preferred embodiment, the bench 102 is constructed from a mechanically and temperature stable substance, such as aluminum nitride, silicon, silicon-metal composite, silicon oxide, or beryllium oxide in various implementations.

Semiconductor laser chip 114 is connected to the bench 102. The illustrated example uses an edge-emitting, stripe semiconductor chip. In more detail, the chip is bonded to a substrate 111 to form a chip hybrid. This chip hybrid is then preferably solder-bonded to the bench 102. A monitoring diode 116 is installed on the bench 102 behind a back facet of the chip 114. Specifically, the monitoring diode 116 is installed on a pedestal structure 118, which is similarly solder-bonded to the bench 102.

An optical fiber pigtail 106 enters the package 10 through a fiber feedthrough in which a ferrule 108 is installed. The endface of the fiber pigtail is secured to the bench 102 in proximity to the front facet of the semiconductor chip 114 along the laser stripe-defined medial line 108.

A deformable fiber mounting structure 104 is used so that the endface 107 is held in a stable but adjustable relationship to the semiconductor laser front facet.

In the illustrated implementation, jaws 210, 212 of an alignment system engage the fiber mounting structure 104. In part of the alignment process, these jaws 210, 212 mechanically engage and plastically deform this mounting structure 104 so that the endface is aligned to receive the light emitted from the laser chip 114.

Figure 1B:
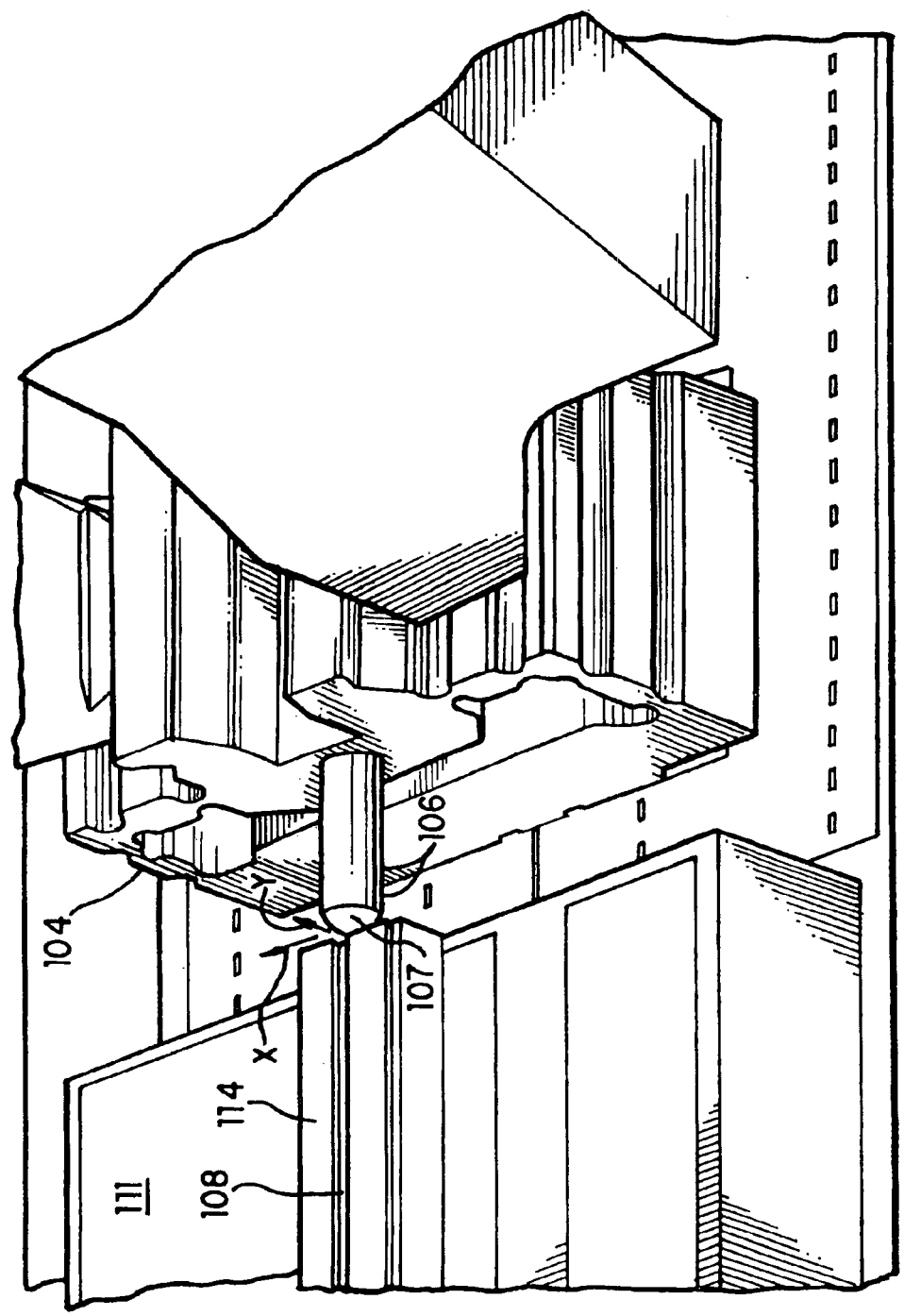

FIG. 1B illustrates the relationship between the fiber endface 107 and the exit facet of the chip 114. This endface 107 is centered on the chip's ridge center line 108 so that coupling efficiency is maximized, i.e., as much light as possible that is generated by the chip is coupled to be transmitted by the fiber pigtail 106. This is achieved by plastically deforming the mounting structure 104.

For the purposes of the following discussion, a Cartesian coordinate system x, y is defined between the fiber endface 107 and the emission area of the chip 114.

Further, the present discussion is specific to aligning a fiber endface to a chip emission pattern. The alignment strategy, however is generally applicable to applications where the optical component comprises a lens, or some other optical component such as a tunable filter or reflective element, that is mounted to the mounting structure and alignment is relative to an optical axis of a surrounding optical train.

Figure 2:
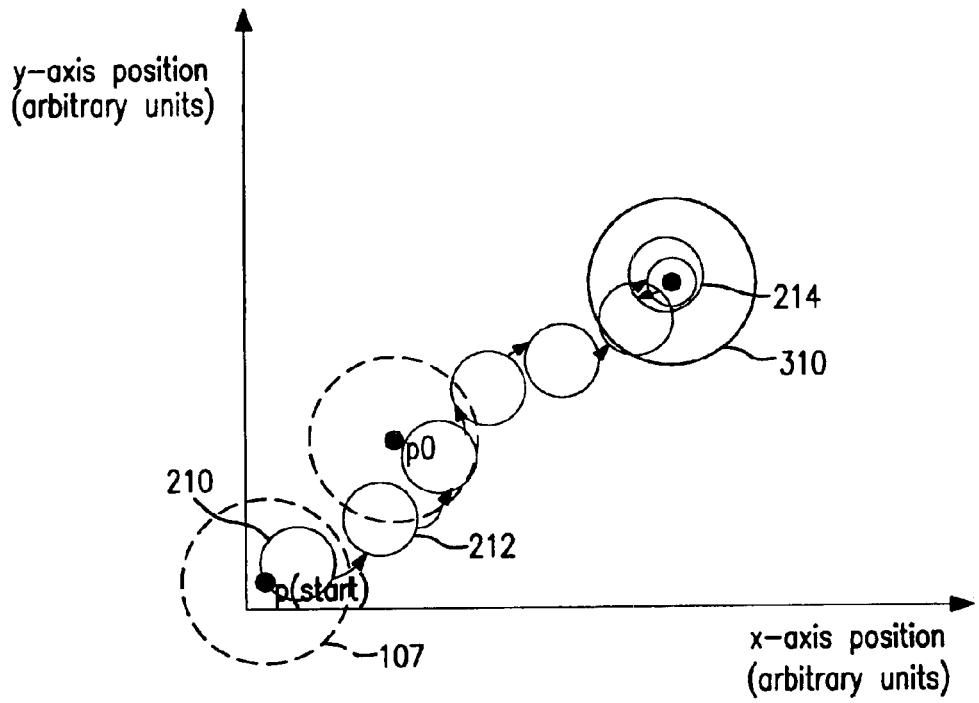
FIG. 2 is plot in a Cartesian coordinate system illustrating an alignment search process according to the present invention utilizing active alignment.

FIG. 2 illustrates a pre-alignment exemplary relationship between the fiber endface 107 and the emission pattern 310 for the chip 114 in the x, y plane.

The relationship between the endface and the emission pattern 310 is typically not initially known. A search process is started in which the endface 107 is moved through the x, y plane to find the emission pattern. In the illustrated example, a circle search algorithm is implemented in which the endface is moved or dithered in circles, repeatedly, while monitoring the coupled light to find the relative direction of the emission 310. The center of the search pattern is then stepped in the direction of the apparent pattern.

More specifically, the optical axis of endface 107 is initially at position p(start). It is then moved in circle 210. Based on the signal measurements during the movement, the general direction of the emission 310 is determined and the search process advanced so that the endface is scanned in circle 212.

The circle scan and step process is repeated until the circle scan is centered on the emission center, see circle 214. Thus, the emission 310 is located. At this location, a force vector 312, magnitude and direction, is recorded. This provides the force and direction of that force that is required to move the endface from a rest position to the position of best coupling efficiency.

When the mounting structure is released after this initial emission search, it may not return to the p(start) position. This typically occurs if the search process resulted in plastic deformation and/or work hardening. As illustrated, when released, the endface snaps-back to position p0.

Figure 3:
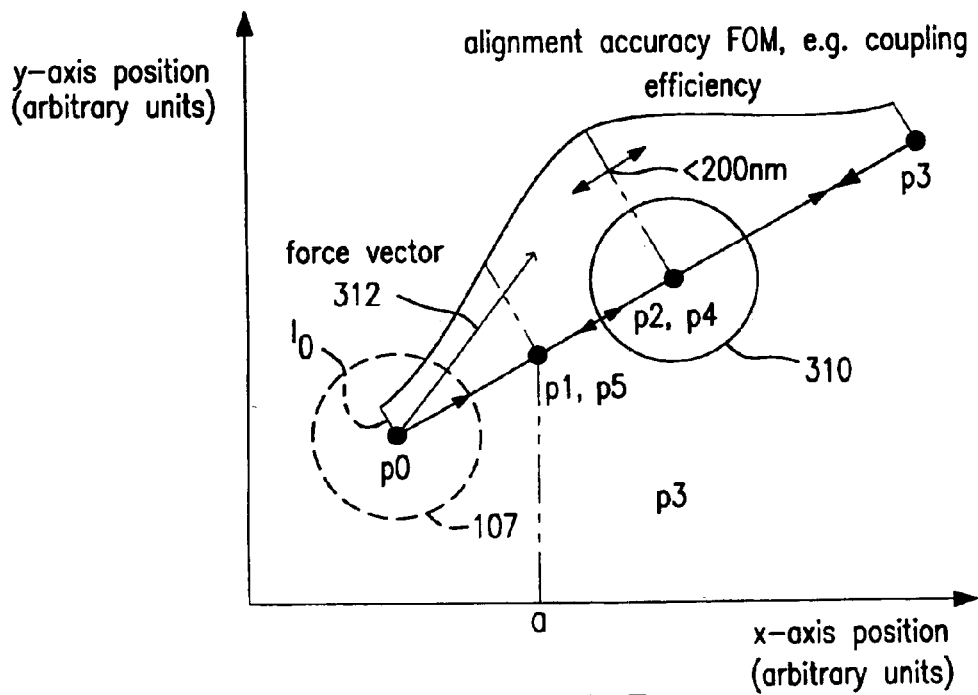
FIG. 3 is a multi-dimensional plot illustrating a plastic deformation alignment process according to the present invention incorporating active alignment.

FIG. 3 is multidimensional plot in which the coupling efficiency figure of merit (FOM) is additionally plotted. Typically, when the fiber endface optical axis is at point p0, the coupling efficiency as illustrated by the distance $l_0$ is very low.

In order to improve the alignment, the force vector 312 is exerted by the jaws 210 and 212 on the mounting structure 104 to improve the alignment between the endface 107 and the chip emission 310.

In the illustrated example, the force vector 312 is not coincident with a line between the center of the endface 107 and the emission pattern 310. This maybe because the mounting structure 104 is more compliant to the X-axis as opposed to the Y-axis deformation.

When the force vector 312 is applied to the mounting structure 104, the endface 107 moves from point p0 to point p1. At point p1, the alignment is improved, as illustrated by the coupling efficiency plot.

Continued deformation, pushes the endface to point p2, where the alignment is ideal. However, because of the elasticity, the mounting structure 104 must be further deformed to point p3 to plastically or permanently deform the alignment structure 104. Plastic deformation is initiated when the force vector exceeds a yield force of the structure 104.

When point p3 is reached, the jaws 210, 212 begin to release force, allowing the mounting structure 104 to return to its new rest position p5. As the force is removed, the FOM is analyzed. This can be an important step in the analysis to ensure convergence. Specifically, as force is removed, the FOM is monitored to ensure that the endface passes over the best alignment position, or laser emission center where the coupling efficiency peaks. In the event that it does not, i.e., the coupled optical energy does not reach the level detected in the initial search within tolerances, a new search process should be initiated.

Figure 4:
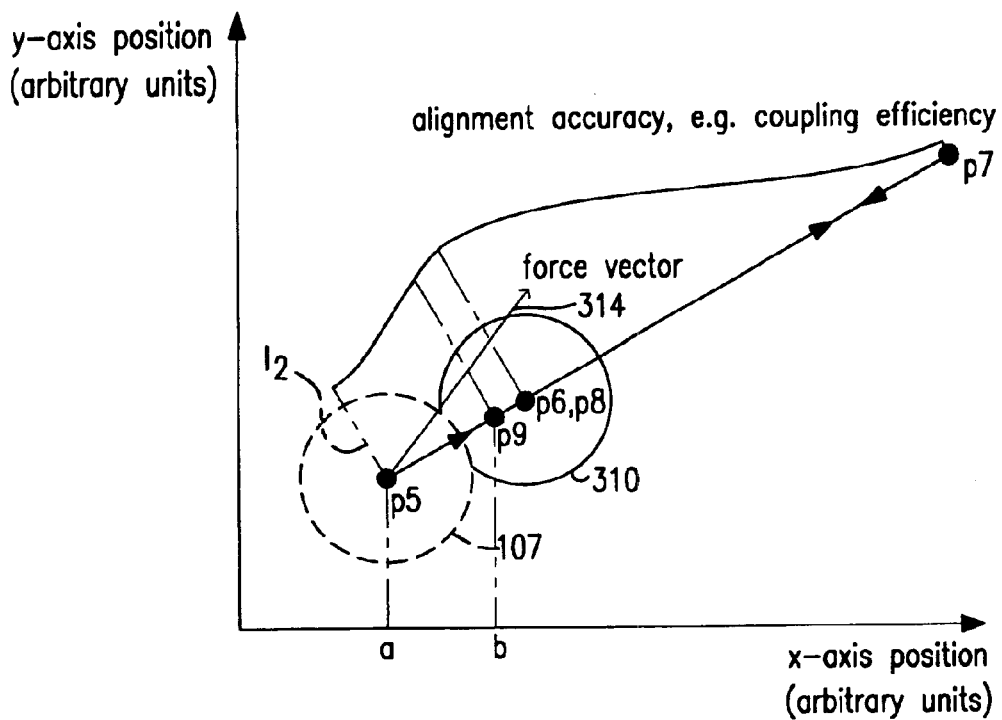
FIG. 4 illustrates the plastic deformation process during an intermediate stage of the alignment, according to the present invention.

FIG. 4 shows the new relationship between the fiber endface 107 and the emission pattern 310 after the plastic deformation step illustrated in FIG. 3. Specifically, the coupling efficiency is improved by the fact that they have been closer together and specifically distance $l_2$. This coupling efficiency, however, is still inadequate, in illustrated example.

Therefore, a second plastic deformation step is performed is illustrated in FIG. 4 where the current yield force of the structure is again exceeded. Force vector 314 is applied and the fiber endface 107 moves from the new rest position p5 through position p6 showing proper alignment to point p7. Then, when the jaws of the alignment system allow the mounting structure to return to a rest position, it returns to new rest position at point p9 because of this second plastic deformation operation.

Figure 5:
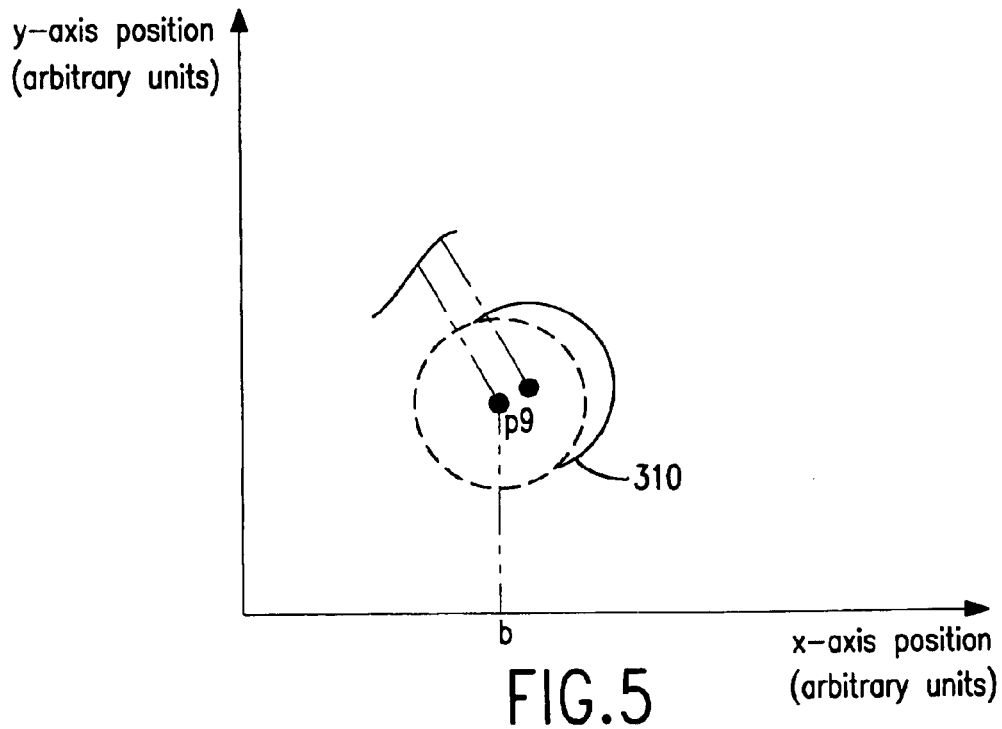
FIG. 5 illustrates the plastic deformation process in a final stage of the process, according to the present invention.

The final alignment position is illustrated in FIG. 5. While alignment is not perfect, the coupling efficiency is very close to the peak. In one application, this alignment accuracy would be adequate. Typically, for conventional high power pump applications, the endface 107 must be aligned to within 200 nanometers of the emission's center.

Generally, care is taken to avoid plastically deforming the endface beyond the target position. This avoids backlash in alignment system.

Figure 6:
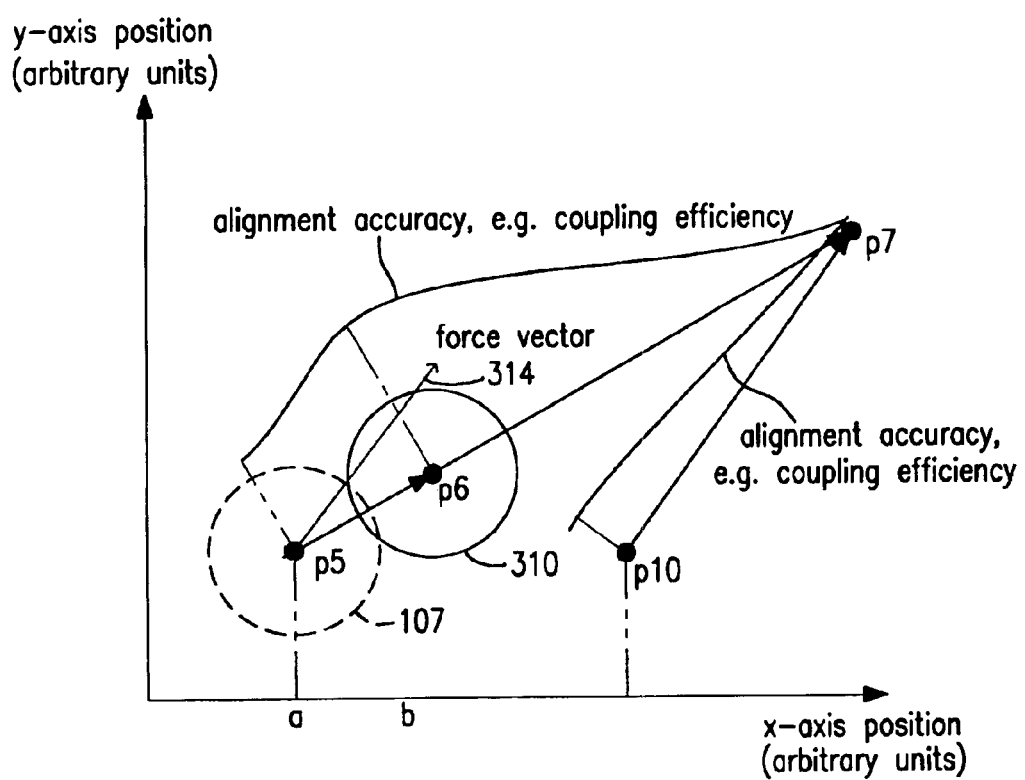
FIG. 6 illustrates the plastic deformation process during an intermediate stage in which the alignment process compensates for an earlier error in plastic deformation, according to the present invention.

As illustrated in FIG. 6, according to an aspect of the invention, the coupling efficiency figure of merit is monitored while the mounting structure is allowed to return to a rest position. If this new rest position, as illustrated by point p10 exhibits poor coupling efficiency because the plastic deformation is not converging to the ideal alignment position p6, a new rest position is determined for p10 and then a new force vector calculated to deform the mounting structure in the direction of point p6.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for aligning an optical component by plastic deformation, the process comprising:

finding a desired position of on optical axis of the optical component relative to a rest position of the optical axis of the optical component by moving the optical axis of the optical component along a path that extends in a circuit around the rest position, the path extending in an x-y plane that is orthogonal to the optical axis of the optical component;

determining a direction of the desired position; and exerting a deformation force that exceeds a yield force to plastically deform the optical component so that the optical axis is in the direction of the desired position;

wherein the rest position is found after the desired position is found to account for any plastic deformation induced during the step of finding the desired position.

2. A process as claimed in claim 1, further comprising avoiding backlash by not deforming the optical component such that a new rest position of the optical axis is opposed the desired position with respect to a previous rest position in a plane that is orthogonal to the optical axis.

3. A process as claimed in claim 1, further comprising monitoring an active alignment signal while exerting the deformation force.

4. A process as claimed in claim 3, further comprising comparing the active alignment signal to a level of the active alignment signal when the optical component was at the desired position.

5. A process as claimed in claim 1, wherein the step of finding the desired position of the optical axis of the optical component comprises monitoring an active alignment signal while moving the optical axis of the optical component.

6. A process as claimed in claim 5, wherein the optical component includes an optical fiber having an endface and a deformable mounting structure that supports the optical fiber on an optical bench, and wherein the step of monitoring the active alignment signal comprises:

generating and coupling an optical signal into the optical fiber;

detecting a level of backreflection of the optical signal into the optical fiber through the endface as the active alignment signal.

7. A process as claimed in claim 6, wherein the step of finding the desired position further comprises positioning the optical component to maximize a level of the backreflection.

8. A process as claimed in claim 6, further comprising monitoring the active alignment signal while exerting the deformation force to assess the plastic deformation of the optical component.

9. A process as claimed in claim 5, wherein the optical component includes an optical fiber having an endface and a deformable mounting structure that supports the optical fiber on an optical bench, and wherein the step of monitoring the active alignment signal comprises:

generating an optical signal by energizing an active device on the optical bench; and detecting a level of the optical signal that is coupled into the optical fiber through the endface as the active alignment signal.

10. A process as claimed in claim 9, wherein the step of finding the desired position further comprises positioning the optical component to maximize a level of the active alignment signal.

11. A process as claimed in claim 9, further comprising monitoring the active alignment signal while exerting the deformation force to assess the plastic deformation of the optical component.

12. A process as claimed in claim 1, wherein the step of moving the optical axis of the optical component along a path around the rest position comprising dithering the optical axis of the optical component.

13. A process for aligning an optical component by plastic deformation, the process comprising:

finding a desired position of an optical axis of the optical component relative to a rest position of the optical axis of the optical component by moving the optical axis of the optical component alon a loo that extends in an x-y plane that is orthogonal to the optical axis of the optical component;

exerting a deformation force that exceeds a yield force to plastically deform the optical component so that the optical axis is moved in a direction of the desired position;

monitoring an active alignment signal while exerting the deformation force;

comparing the active alignment signal to a level of the active alignment signal when the optical component was at the desired position; and finding a new desired position relative to a new rest position, if a level of the active signal detected while exerting the deformation force is less than the level of the active alignment signal when the optical component was at the desired position by a predetermined tolerance.

14. A process for aligning an optical component by plastic deformation, the process comprising:

finding a desired position of an optical axis of the optical component relative to a rest position of the optical axis of the optical component by moving the optical axis of the optical component along a oath that extends in an x-y plane that is orthogonal to the optical axis of the optical component;

exerting a deformation force that exceeds a yield force to plastically deform the optical component so that the optical axis is moved in a direction of the desired position;

wherein the step of finding the desired position of the optical axis of the optical component comprises monitoring an active alignment signal while moving the optical axis of the optical component; and wherein the optical component includes an optical element and a deformable mounting structure that supports the optical element on an optical bench, and wherein the step of monitoring the active alignment signal comprises:

transmitting an optical signal to the optical element;

detecting the optical signal after interaction with the optical element;

spectrally analyzing the optical signal for side mode suppression; and using the side mode suppression as the active alignment signal.

15. A process as claimed in claim 14 wherein the step of finding the desired position further comprises positioning the optical component to maximize the level of the side mode suppression.

16. A process as claimed in claim 14, further comprising monitoring the active alignment signal while exerting the deformation force to assess the plastic deformation of the optical component.

* * * * *

UNITED STATES PATENT AND TRADEMARK OFFICE
CERTIFICATE OF CORRECTION

PATENT NO. : 6,941,631 B2
DATED : September 13, 2005
INVENTOR(S) : Robert K. Jenner It is certified that error appears in the above-identified patent and that said Letters Patent is hereby corrected as shown below:

Column 6,
Line 62, after "axis is" insert -- moved --.

Column 8,
Line 2, after "component" change "alon" to -- along --; and after "a", change "loo" to -- loop --.
Line 26, change "oath" to -- path --.

Signed and Sealed this

Fifteenth Day of November, 2005

JON W. DUDAS
*Director of the United States Patent and Trademark Office*